United States Patent [19]

Crifasi

[11] 4,054,730
[45] Oct. 18, 1977

[54] WINTER POWER SAVER

[76] Inventor: Salvatore Crifasi, 245 Ridgewood Ave., Brooklyn, N.Y. 11208

[21] Appl. No.: 706,240

[22] Filed: July 19, 1976

[51] Int. Cl.² .............................................. H01M 2/02
[52] U.S. Cl. ...................................................... 429/120
[58] Field of Search ................ 429/99, 100, 120, 163, 429/175, 176

[56] References Cited

U.S. PATENT DOCUMENTS

| | | | |
|---|---|---|---|
| 3,146,132 | 8/1964 | Nathan | 429/100 |
| 3,527,925 | 9/1970 | Toyooka et al. | 429/163 |

FOREIGN PATENT DOCUMENTS 518,129  11/1955  Canada ................................. 429/120

Primary Examiner—Donald L. Walton
Attorney, Agent, or Firm—Allen D. Brufsky

[57] ABSTRACT

An insulated battery cover to protect a vehicle storage battery from cold weather including a pair of substantially L-shaped insulated plates which are the mirror image of each other provided with bendable tabs on the short legs of each plate inserted through slots in the long legs of the other one of each plate and bent to lock the cover around a battery.

5 Claims, 3 Drawing Figures

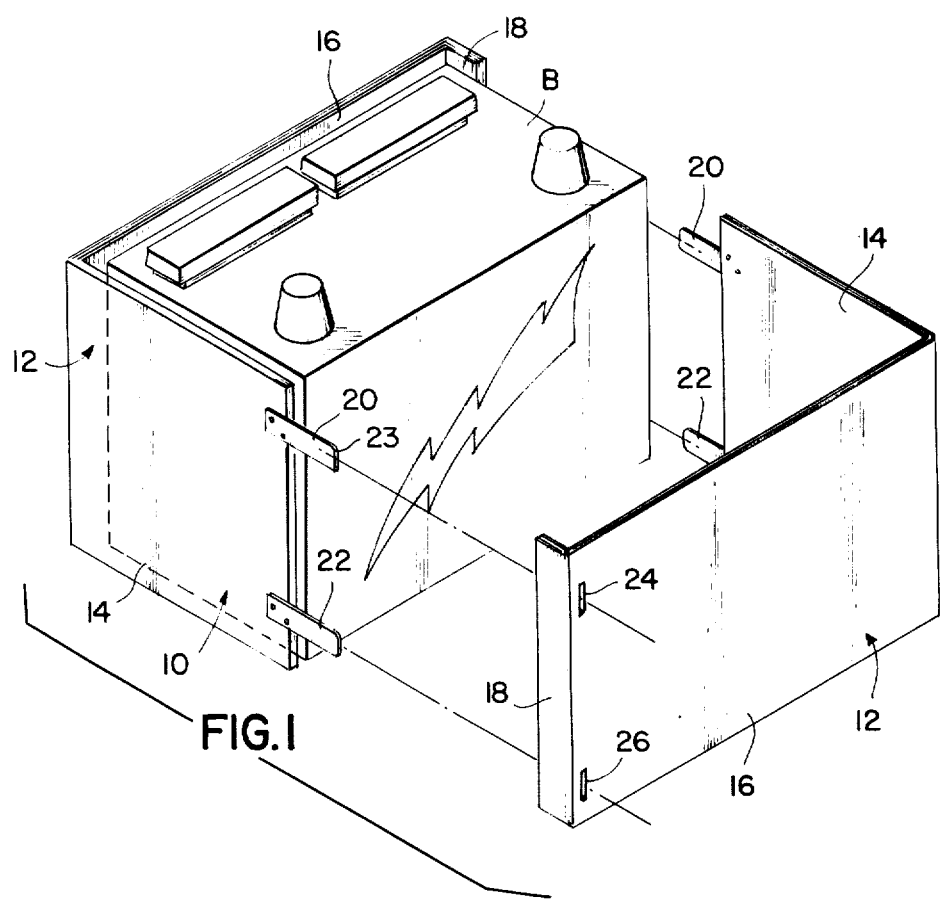
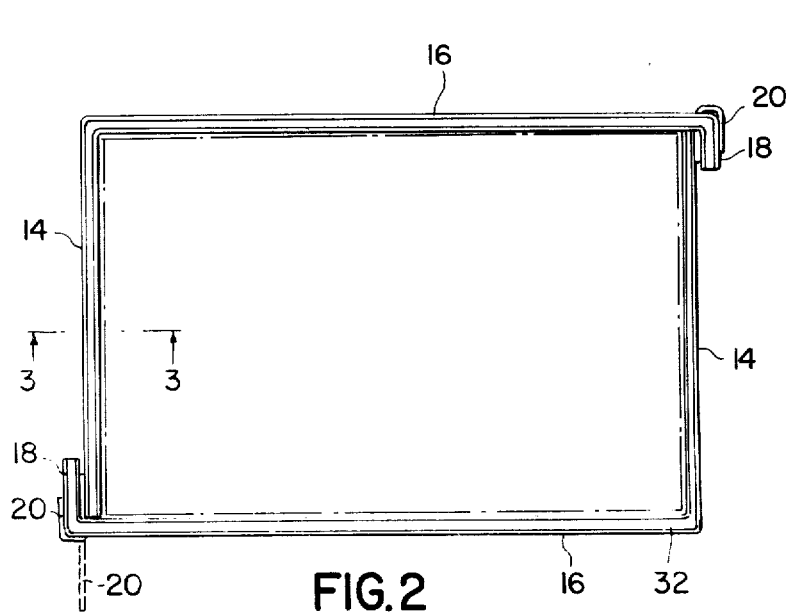
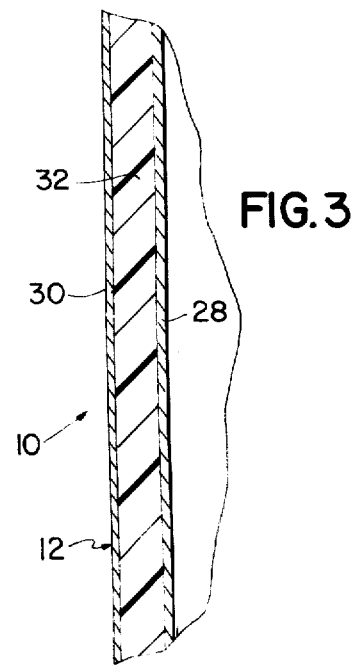

4,054,730

WINTER POWER SAVER

BACKGROUND OF THE INVENTION

This invention relates to a motor vehicle storage battery cover.

Motor vehicle batteries weaken considerably when subjected to extreme cold. The temperature of the electrolyte of the battery is substantially decreased under the influence of low ambient temperature. Since the reaction velocity of the electrolyte depends upon the temperature of the electrolyte, the electromotive force produced by the battery is substantially decreased in cold weather, and may be insufficient to provide a spark to start the engine of a motor vehicle.

SUMMARY OF THE INVENTION

Accordingly, this invention provides an insulated cover which may quickly be attached to a storage battery in cold weather to conserve its energy. The cover includes two substantially L-shaped plates which are the mirror image of each other provided with bendable tabs on the short legs of each of the plates which are inserted through slots in the long legs of each of the plates and bent to lock the cover around the battery. Each of the plates is a laminated structure having inner and outer aluminum plies between which FIBERLASS insulation is provided.

BRIEF DESCRIPTION OF THE DRAWING

Further objects and advantages of the invention will become apparent from the following description and claims, and from the accompanying drawing, wherein:

FIG. 1 is an exploded perspective view of the battery cover of the invention applied to a vehicle battery;

FIG. 2 is a top plan view of the battery cover of FIG. 1; and

FIG. 3 is a cross-sectional view taken substantially along the plane indicated by line 3—3 of FIG. 2.

DETAILED DESCRIPTION OF THE PREFERRED EMBODIMENT

Referring now in detail to the drawing, wherein like numerals indicate like elements throughout the several views, the battery cover 10 of the present invention includes two, substantially L-shaped plates 12 which are the mirror image of each other. Each plate 12 includes a short leg 14 connected at a right angle to a long leg 16 and a short flange 18 parallel to leg 14.

Bendable tabs 20 and 22 having rounded edges 23 are attached in spaced, vertical relation on the short leg 14 of each plate 12 by rivets or other suitable fasteners, which are inserted through slots 24 and 26, respectively, in the long leg of the other one of each plate 12 and bent around short flange 18 to lock the cover 10 around a battery B.

As shown in FIG. 3, each of the plates 12 is a laminated structure having inner and outer aluminum plies 28, 30 sandwiching a ply of FIBERGLASS insulation 32, to protect battery B from cold weather.

I claim:
1. A battery cover comprising:
   a pair of insulated, substantially L-shaped plates which are the mirror image of each other, and
   means on said plates for locking said plates to each other around a storage battery, said locking means including at least one bendable tab on the shorter leg of each of said plates for inserting through a slot on the longer leg of each of said other plates and bending to lock the cover to the battery.
2. The battery cover of claim 1 wherein each of said plates is a laminated structure having an inner and outer metal ply sandwiching a ply of insulation material.
3. The battery cover of claim 2 wherein said insulation material is FIBERGLASS.
4. The battery cover of claim 3 wherein said metal plies are aluminum.
5. The battery cover of claim 1 including a short flange connected to the long leg of each of said L-shaped plates parallel to the short leg thereof.

* * * * *